(12) United States Patent
Yang

(10) Patent No.: US 11,205,537 B2
(45) Date of Patent: Dec. 21, 2021

(54) MAGNETIC COMPONENT, RESONANT ELECTRICAL CIRCUIT, ELECTRICAL CONVERTER AND ELECTRICAL SYSTEM

(71) Applicant: Valeo Siemens eAutomotive France SAS, Cergy (FR)

(72) Inventor: Gang Yang, Courbevoie (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 63 days.

(21) Appl. No.: 15/482,164

(22) Filed: Apr. 7, 2017

(65) Prior Publication Data

US 2017/0294259 A1  Oct. 12, 2017

(30) Foreign Application Priority Data

Apr. 8, 2016 (FR) ...................................... 1653154

(51) Int. Cl.
| | |
|---|---|
| H01F 27/24 | (2006.01) |
| H01F 3/10 | (2006.01) |
| B60R 16/033 | (2006.01) |
| H01F 27/28 | (2006.01) |
| H02M 3/24 | (2006.01) |
| H01F 3/14 | (2006.01) |

(52) U.S. Cl.
CPC ............ *H01F 27/24* (2013.01); *B60R 16/033* (2013.01); *H01F 3/10* (2013.01); *H01F 27/2823* (2013.01); *H02M 3/24* (2013.01); *H01F 3/14* (2013.01); *H01F 2003/103* (2013.01)

(58) Field of Classification Search
CPC ...... H01F 27/24; H01F 27/2823; H02M 3/24; B60R 16/033
See application file for complete search history.

(56) References Cited

U.S. PATENT DOCUMENTS

| | | | |
|---|---|---|---|
| 2,137,433 A | 11/1938 | Wirz | |
| 3,686,561 A | 8/1972 | Spreadbury | |
| 4,206,434 A * | 6/1980 | Hase | ....................... H01F 21/08 |
| | | | 174/DIG. 17 |

(Continued)

FOREIGN PATENT DOCUMENTS

| | | |
|---|---|---|
| FR | 2134409 | 8/1972 |
| GB | 2254202 A | 9/1992 |

OTHER PUBLICATIONS

Search Report for French Application No. 1653154 dated Dec. 21, 2016.

*Primary Examiner* — Daniel Kessie
(74) *Attorney, Agent, or Firm* — McCormick, Paulding & Huber PLLC

(57) ABSTRACT

The magnetic component comprises: a magnetic core comprising an E-shaped lower part, an E-shaped upper part and an I-shaped central part closing both the lower part and the upper part such that the lower part and the central part define two lower magnetic circuits and the upper part and the central part define two upper magnetic circuits; a first coil and a second coil wound around a central branch of the lower part to be coupled to one another; a third coil wound around a central branch of the upper part, the third coil being connected in series with the second coil. The central part has a reluctance lower than both that of the lower part along each lower magnetic circuit and that of the upper part along each upper magnetic circuit.

15 Claims, 4 Drawing Sheets

(56) References Cited

U.S. PATENT DOCUMENTS

| | | | | |
|---|---|---|---|---|
| 5,469,053 A | * | 11/1995 | Laughlin | G01D 5/2216 |
| | | | | 324/207.18 |
| 6,456,069 B1 | * | 9/2002 | Scarzello | G01R 33/045 |
| | | | | 324/202 |
| 7,199,569 B1 | * | 4/2007 | Nakahori | H02M 3/335 |
| | | | | 323/355 |
| 2002/0149458 A1 | * | 10/2002 | Fujiwara | H01F 1/0552 |
| | | | | 336/110 |
| 2005/0212637 A1 | * | 9/2005 | Hsueh | H01F 27/306 |
| | | | | 336/182 |
| 2006/0175981 A1 | * | 8/2006 | Hsueh | H05B 41/2827 |
| | | | | 315/274 |
| 2007/0159289 A1 | * | 7/2007 | Lee | H01F 27/24 |
| | | | | 336/212 |
| 2008/0224809 A1 | * | 9/2008 | Zhang | H01F 3/12 |
| | | | | 336/170 |
| 2009/0033255 A1 | * | 2/2009 | John | B60L 58/20 |
| | | | | 318/139 |
| 2009/0303652 A1 | | 12/2009 | Tallam et al. | |
| 2011/0101865 A1 | * | 5/2011 | Cheng | H05B 41/2822 |
| | | | | 315/121 |
| 2014/0306788 A1 | * | 10/2014 | Umetani | H01F 27/385 |
| | | | | 336/173 |
| 2016/0035478 A1 | * | 2/2016 | Furui | H01F 27/2804 |
| | | | | 336/192 |
| 2016/0300657 A1 | * | 10/2016 | Wu | H01F 3/10 |

\* cited by examiner

MAGNETIC COMPONENT, RESONANT ELECTRICAL CIRCUIT, ELECTRICAL CONVERTER AND ELECTRICAL SYSTEM

CROSS REFERENCE TO RELATED APPLICATION

This application claims foreign priority benefits under U.S.C. § 119 to French Patent Application No. 1653154 filed on Apr. 8, 2016, the content of which is hereby incorporated by reference in its entirety.

TECHNICAL FIELD

The present invention relates to resonant electrical circuits, in particular used in electrical converters.

BACKGROUND

The article "Design guideline for magnetic integration in LLC resonant converters" by De Simone et al., published in 2008 as part of the conference: "Power Electronics, Electrical Drives, Automation and Motion, 2008. SPEEDAM 2008," describes a magnetic component comprising:
- a magnetic core comprising a first branch, a second branch and a third branch coming together at both of their ends and having respective reluctances,
- a first coil and a second coil wound around the first branch to be coupled to one another.

In this article, it is proposed to form a resonant electrical circuit of the LLC type adding a serial capacitance of the inductances and voluntarily reducing the coupling between the two coils so as to create a serial inductance Lr, in addition to a magnetizing inductance $L_m$. This imperfect coupling is obtained by separating the coils from one another. Thus, the bulk of the resonant electrical circuit can be reduced.

However, it is difficult to achieve large serial inductance values Lr without increasing the size of the magnetic core, and without causing losses to appear by Foucault current. Furthermore, since the value of the serial inductance Lr depends on the position of the coils, it is difficult to set it precisely and reliably, i.e., reproducibly.

The invention aims to propose a magnetic component making it possible to set the value of the serial inductance Lr precisely and reliably, while having a reduced bulk.

SUMMARY

To that end, a magnetic component is proposed, characterized in that it comprises:
- a magnetic core comprising an E-shaped lower part, an E-shaped upper part and an I-shaped central part closing both the lower part and the upper part such that the lower part and the central part define two lower magnetic circuits and the upper part and the central part define two upper magnetic circuits,
- a first coil and a second coil wound around a central branch of the lower part to be coupled to one another,
- a third coil wound around a central branch of the upper part, the third coil being connected in series with the second coil, the central part having a reluctance lower than both that of the lower part along each lower magnetic circuit and that of the upper part along each upper magnetic circuit.

Optionally, the upper part comprises a first air gap.

Also optionally, the central branch of the upper part comprises the first air gap.

Also optionally, the central branch of the upper part comprises a bar, one end of which stops at a distance from the central part so as to form the first air gap.

Also optionally, the lower part comprises a second air gap.

Also optionally, the central branch of the lower part comprises the second air gap.

Also optionally, the central branch of the lower part comprises two aligned bars having ends opposite one another, separated from one another so as to form the second air gap.

Also optionally, the central branch of the lower part and the central branch of the upper part have no air gap.

Also optionally, the lower part and the upper part of the magnetic core are made with a material having a maximum relative permeability below 100, while the central part is made with a material having a maximum relative permeability above 100, preferably above 1000.

Also optionally, the first and second coils have respective self-inductances L1, L2 and are coupled to one another so as to have a non-zero mutual inductance M, connected to the self-inductances L1 and L2 by a coupling coefficient k:

$$k = \frac{M}{\sqrt{L1 \cdot L2}}$$

the coupling coefficient k being greater than or equal to 0.9, preferably greater than or equal to 0.95, also preferably greater than or equal to 0.99.

Also optionally, the magnetic core has an axial symmetry relative to a vertical axis centered on the central branches of the upper and lower parts.

Also optionally, the magnetic component comprises three E-shaped mechanical pieces each having a transverse bar from which two side bars and a central bar originate, the two first mechanical pieces are assembled across from one another such that their side and central bars are respectively aligned, these two first mechanical pieces forming the lower and central parts of the magnetic core, the central part being formed by the transverse bar of one of these two mechanical pieces, and the third mechanical piece is assembled against the transverse bar forming the central part so as to form the upper part of the magnetic core.

Also proposed is a resonant electrical circuit comprising:
- a magnetic component according to the invention,
- a capacitance connected in series with the second coil and the third coil.

Also proposed is an electrical converter comprising:
- a voltage generator designed to provide a variable voltage from a direct voltage,
- a resonant electrical circuit according to the invention for providing an alternating current from the variable voltage,
- a rectifier designed to provide a direct voltage to an electrical charge from the alternating current.

Optionally, the rectifier comprises:
- a smoothing capacitance intended to be connected in parallel with the electrical charge,
- a diode bridge connected as input at the ends of the first coil and as output at the terminals of the smoothing capacitance.

Also optionally, the rectifier comprises:
- a smoothing capacitance intended to be connected in parallel with the electrical charge, one terminal of the smoothing capacitance being connected to a midpoint of the first coil,
- two diodes through which the other terminal of the smoothing capacitance is respectively connected to both ends of the first coil.

Also proposed is an electrical system comprising a voltage source such as a motor vehicle battery, an electrical charge such as electrical motor vehicle accessories, and an electrical converter according to the invention between the voltage source and the electrical charge.

DETAILED DESCRIPTION

Figure 1:
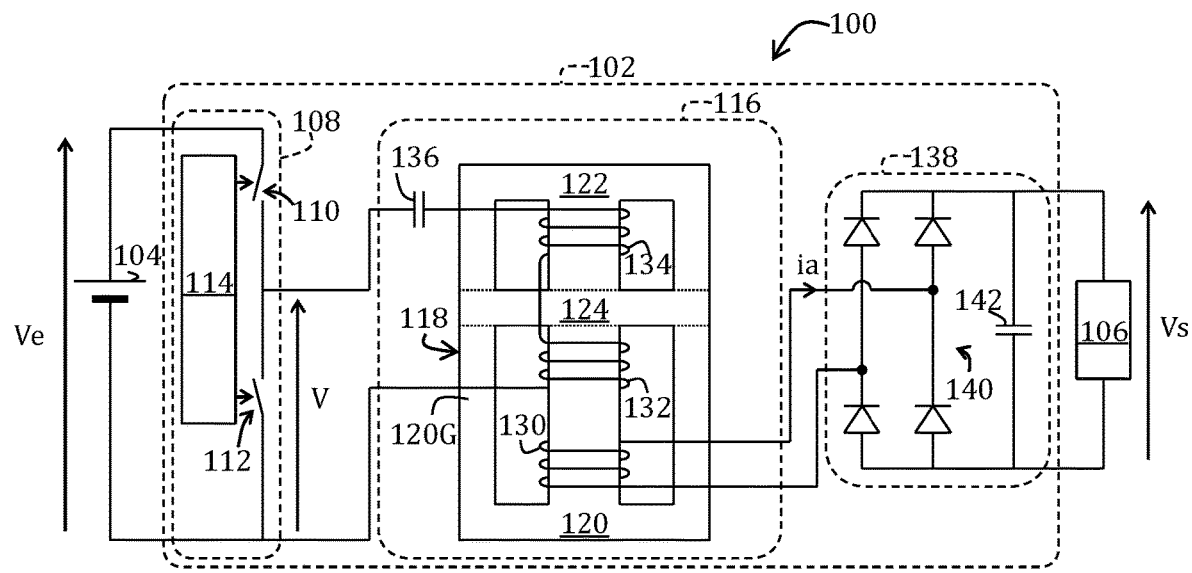
FIG. 1 is an electrical diagram of an electrical system comprising an electrical converter according to the invention.

An electrical system 100 comprising an electrical converter 102 implementing the invention will now be described in reference to FIG. 1. Such an electrical system 100 can for example be used in a motor vehicle.

The electrical system 100 first comprises a voltage source 104 designed to provide an input voltage Ve, which is direct. The voltage source 104 for example comprises a motor vehicle battery.

The electrical system 100 further comprises an electrical charge 106, such as electrical motor vehicle accessories.

The electrical converter 102 is designed to receive the input voltage Ve and to provide an output voltage Vs to the electrical charge 106.

In the described example, the electrical converter 102 is of the DC-DC type, such that the output voltage Vs is direct. More specifically, in the described example, the electrical converter 102 is an LLC resonant converter.

The electrical converter 102 comprises a voltage generator 108 designed to provide a variable voltage V, at a desired frequency, from the input voltage Ve.

Preferably, the variable voltage V is a direct voltage (i.e., not changing sign). In the described example, the variable voltage V is a squared voltage. To that end, the voltage generator 108 comprises two switches 110, 112 and a control device 114 of the switches 110, 112, such that the variable voltage alternately assumes the value of the input voltage Ve and the zero value.

The electrical converter 102 further comprises a resonant electrical circuit 116 designed to provide, from the variable voltage, an alternating current is at the same frequency as the variable voltage V.

The resonant electrical circuit 116 first comprises a magnetic core 118.

In the example of FIG. 1, the magnetic core is for example made from a ferrite material.

The magnetic core 118 comprises an E-shaped lower part 120, an E-shaped upper part 122 and an I-shaped central part 124.

The shape of the magnetic core 118 will be described in more detail in reference to FIG. 2.

The lower part 120 first comprises a left vertical branch 120G, a central vertical branch 120C and a right vertical branch 120D, all three of which are rectilinear and parallel to one another. The lower part 120 further comprises a horizontal branch 120T that is rectilinear and perpendicular to the three vertical branches 120G, 120C, 120D. Three respective first ends of the three vertical branches 120G, 120C, 120D rejoin the horizontal branch 120T.

The upper part 122 first comprises a left vertical branch 122G, a central vertical branch 122C and a right vertical branch 122D, all three of which are rectilinear and parallel to one another. The upper part 122 further comprises a horizontal branch 122T that is rectilinear and perpendicular to the three vertical branches 122G, 122C, 122D. Three respective first ends of the three vertical branches 122G, 122C, 122D rejoin the horizontal branch 122T.

The central part 124 comprises a horizontal branch 124T that is rectilinear and perpendicular to the three vertical branches 120G, 120C, 120D of the lower part 120 and the three vertical branches 122G, 122C, 122D of the upper part 122. Three respective second ends of the three vertical branches 120G, 120C, 120D of the lower part 120 and three respective second ends of the three vertical branches 122G, 122C, 122D of the upper part 122 rejoin the horizontal branch 124T. Thus, the central part 124 closes both the upper part 122 and the lower part 120 of the magnetic core.

The left vertical branches 120G, 122G are in the continuation of one another. The central vertical branches 120C, 122C are in the continuation of one another. The right vertical branches 120D, 122D are in the continuation of one another.

Furthermore, the magnetic core 118 has an axial symmetry relative to a vertical axis centered on the central vertical branches 120C, 122C.

Thus, the lower part 120 and the central part 124 define two closed lower magnetic circuits 126G, 126D in loop form. The central part 124 has a reluctance lower, preferably at least ten times lower, also preferably at least one hundred times lower, than the reluctance of the lower part 120 along each lower magnetic circuit 126G, 126D.

Likewise, the upper part 122 and the central part 124 define two closed upper magnetic circuits 128G, 128D in loop form. The central part 124 has a reluctance lower, preferably at least ten times lower, also preferably at least one hundred times lower, than the reluctance of the upper part 122 along each upper magnetic circuit 128G, 128D.

Returning to FIG. 1, the resonant electrical circuit 116 further comprises a first coil 130 and a second coil 132 wound around the central vertical branch 120C of the lower part 120. The coils 130, 132 have respective self-inductances L1, L2 and are coupled to one another so as to have a non-zero mutual inductance M, connected to the self-inductances L1 and L2 by a coupling coefficient k:

$$k = \frac{M}{\sqrt{L1 \cdot L2}}$$

Preferably, the coils 130, 132 are strongly coupled to one another, which results in a coupling coefficient k greater than or equal to 0.9, preferably greater than or equal to 0.95, also preferably greater than or equal to 0.99.

The resonant electrical circuit 116 further comprises a third coil 134 wound around the central vertical branch 122C of the upper part 122.

The resonant electrical circuit 116 further comprises a capacitance 136 connected in series with the coils 132, 134.

Since the coils 132, 134 are in series, it is possible to make them with a single wire, which makes it possible to avoid wire end losses.

The electrical converter 102 further comprises a rectifier 138 designed to supply the output voltage Vs from the alternating current ia.

In the described example, the rectifier 138 comprises a diode bridge 140, as well as a smoothing capacitance 142. The diode bridge 140 is connected as input at both ends of the coil 130, and as output at the terminals of the smoothing capacitance 142 and electrical charge 106.

Figure 3:
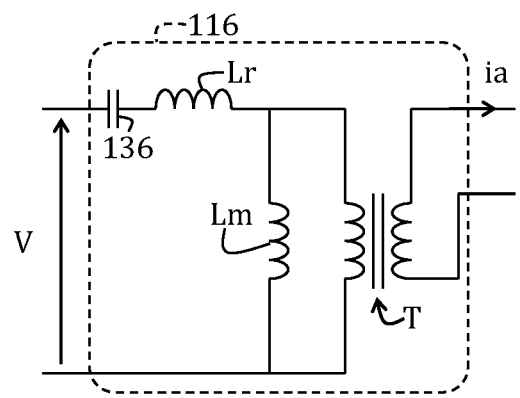
FIG. 3 is an equivalent electrical diagram of a resonant electrical circuit of the electrical converter of FIG. 1.

In reference to FIG. 3, the resonant electrical circuit 116 is shown with an equivalent electrical diagram at the magnetic core 118 and the coils 130, 132, 134.

The coils 130, 132 form an ideal transformer T and a magnetizing inductance Lm at the primary of the ideal transformer T. The value of the magnetizing inductance Lm is in particular defined by the width of the air gap e2. The third coil 134 forms a serial inductance Lr. The value of the serial inductance Lr is in particular defined by the width of the air gap e1.

Figure 4:
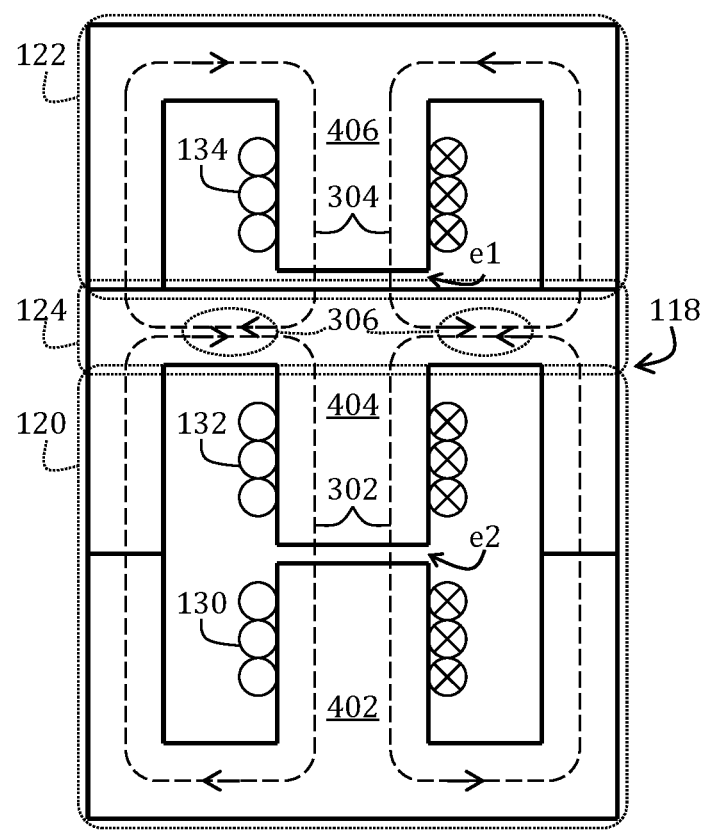
FIG. 4 is a sectional view of a magnetic core and coils wound around the magnetic core, part of the resonant electrical circuit of FIGS. 1 and 2.

An example embodiment of the magnetic core 118 and the winding of the coils 130, 132, 134 is shown in reference to FIG. 4.

Figure 2:
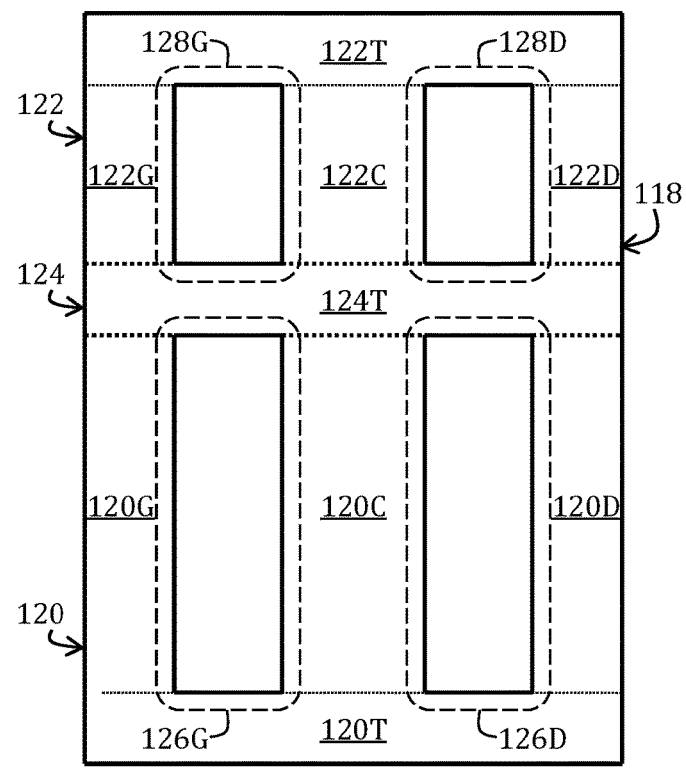
FIG. 2 is a front view of a magnetic core of the electrical converter of FIG. 1.

Although the form of the magnetic core 118 has been described in FIGS. 1 and 2 by breaking the latter down into three parts 120, 122, 124, this does not mean that the magnetic core 118 is always obtained by assembling three pieces corresponding to these three parts 120, 122, 124. In the described example, the magnetic core 118 is obtained by assembling three E-shaped mechanical pieces 402, 404, 406 each having a transverse bar from which two side bars and a central bar originate.

The pieces 402, 404 are assembled across from one another such that their side and central bars are respectively aligned. Furthermore, the free ends of their side bars come together. The central bar of at least one of the pieces 402, 404 is not as long as the side bars surrounding it, such that the central bars of the pieces 402, 404 have ends opposite one another, separated from one another so as to form an air gap e2.

The piece 406 is assembled against the transverse bar of the piece 404 such that its side bars rejoin the transverse bar of the piece 404. The central bar of the piece 406 is not as long as the side bars surrounding it, such that the free end of the central bar of the piece 406 stops at a distance from the transverse bar of the piece 404 so as to form an air gap e1.

Thus, in the described example, the upper part 122 of the magnetic core 118 is formed by the piece 406 and the air gap e1. Furthermore, the central part 124 of the magnetic core 118 is formed by the transverse bar of the piece 404. Furthermore, the lower part 120 of the magnetic core 118 is formed by the piece 402, the side and central bars of the piece 404 and the air gap e2.

Each of the air gaps e1, e2 can be left filled with air, or it can be filled with a material having a low permeability (maximum relative permeability below 100).

In particular, the air gap e1 has a length, also denoted e1, chosen to obtain the serial inductance Lr, for example using the following formula:

$$e1 = N^2 \cdot \mu 0 \cdot Se1 / Lr$$

where N represents the number of turns of the coil 134, µ0 represents the permeability of the vacuum and Se1 represents the cross-section of the branch 124.

Furthermore, the air gap e2 has a length, also denoted e2, chosen to obtain the magnetizing inductance Lm, for example using the following formula:

$$e2 = N1^2 \cdot \mu 0 \cdot Se2 / Lm$$

where N1 represents the number of turns of the coil 132, µ0 represents the permeability of the vacuum and Se2 represents the cross-section of the branch 120.

Furthermore, the coil 130 can be wound around the coil 132, in order to improve the coupling between them.

The coil 132 is intended to generate a magnetic flux 302 in the lower 120 and central 124 parts of the magnetic core 118, while the coil 134 is intended to generate a magnetic flux 304 in the upper 122 and central 124 parts of the magnetic core.

Since the central part 124 of the magnetic core 118 has a low reluctance, the magnetic fluxes 302, 304 loop back by this central part branch 124. In this way, the coil 134 is magnetically isolated from the coils 130, 132, such that the transformer formed by the coils 130, 132 and the serial inductance Lr formed by the coil 134 work independently of one another.

The winding direction of the coils 132, 134 is chosen such that the magnetic fluxes 302, 304 travel through the central part 124 in opposite directions. Thus, the resulting magnetic flux 306 in the central part 124 remains weak. For example, the coils 132, 134 are wound in the same rotation direction.

The coils 130, 132, 134 are preferably made with Litz wire, which makes it possible to reduce the eddy current losses. Nevertheless, other types of conductors could be used, for example round conductors or copper plates.

Figure 5:
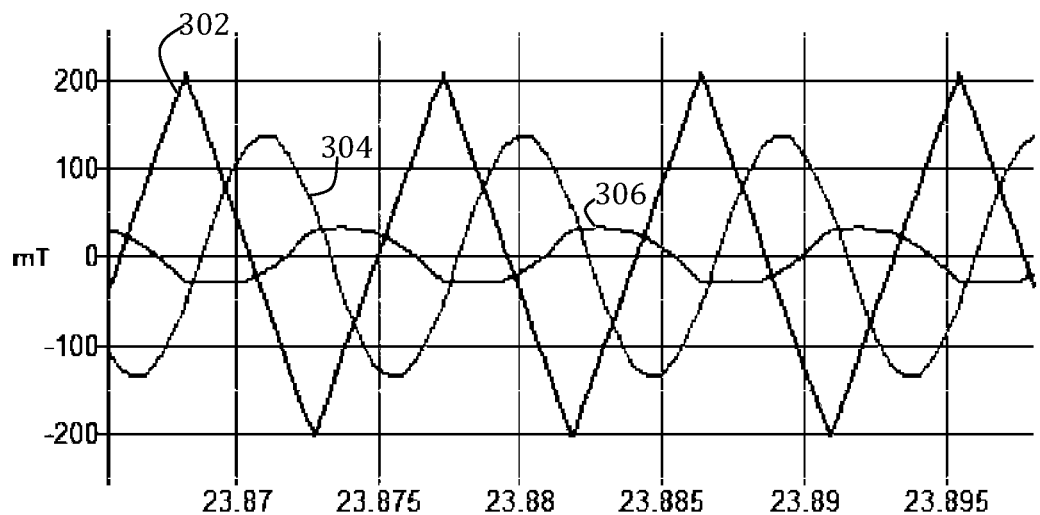
FIG. 5 is a timing diagram of magnetic fluxes traveling through the magnetic core of FIG. 3.

An example of the evolution over time of the magnetic fluxes 302, 304, 306 is shown in reference to FIG. 5. One will in particular appreciate that the resulting magnetic flux 306 is weaker than the other two magnetic fluxes 302, 304. Thus, the losses in the central part 124 of the magnetic core 118 are reduced and the risk of appearance of a hotspot is also reduced. Furthermore, the cross-section of the central part 124 is reduced, which makes it possible to improve the compactness of the resonant electrical circuit 116. Furthermore, since the transformer formed by the coils 130, 132 and the coil 134 share the same magnetic core, and in particular the central part 124, less magnetic core is used.

The operation of the electrical system 100 will now be described.

The voltage generator 108 generates the squared variable voltage V, by cutting the input voltage Ve to a desired frequency.

The variable voltage V is applied across the terminals of the capacitance 136 and the coils 132, 134, which are therefore excited at the frequency of the variable voltage V. In response to this excitation, the alternating current ia appears in the coil 130.

The rectifier 140 rectifies the alternating current ia and provides the rectified current to the electrical charge 106 and the smoothing capacitance 142, the latter smoothing the output voltage Vs so that it is direct.

It is thus possible to obtain, selectively, an output voltage Vs that is smaller or higher than the input voltage Ve.

An alternative embodiment of the magnetic core 118 will now be described in reference to FIG. 6.

In this alternative, the magnetic core 118 no longer has an air gap. The parts 120, 122, 124 are made by assembling three corresponding pieces, and therefore designated by the same references. The pieces 120, 122 are made from a material having a low permeability (maximum relative permeability below 100) such as powdered metals, while the piece 124 is made from a material having a high permeability (maximum relative permeability above 100, preferably above 1000).

Figure 7:
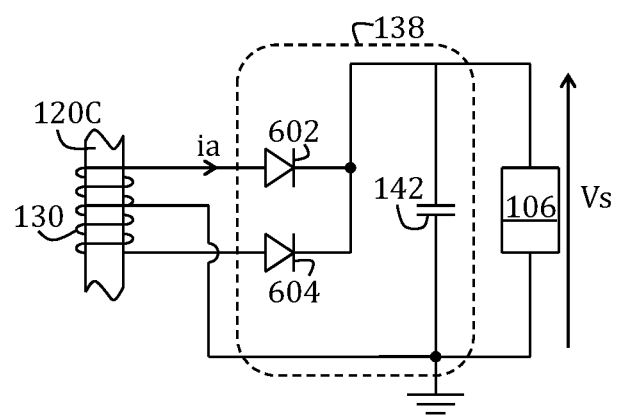
FIG. 7 is an electrical diagram of an alternative resonant electrical circuit according to the invention.

An alternative embodiment of the resonant electrical circuit 116 and the rectifier 138 will now be described in reference to FIG. 7.

In this alternative, the rectifier 138 is connected by center-tap to the coil 130. More specifically, one terminal of the smoothing capacitance 142 and the electrical charge 106 is connected at a midpoint of the coil 130, while the other terminal of the smoothing capacitance 142 and the electrical charge 106 is connected to both ends of the coil 130 through two diodes 602, 604, respectively, allowing the current originating from the coil 130 to pass.

According to the above description, it appears that the invention makes it possible to produce magnetizing Lm and serial Lr inductances precisely, and with a reliability compatible with the requirements of industrial production.

Furthermore, as is known in itself, the magnetic fields escape from the magnetic core 118 at the air gaps e1, e2. Since these air gaps e1, e2 are formed in the central branches 120C, 122C that are surrounded by right and left branches 120G, 122G, 120D, 122D, this escaped magnetic field remains in the bulk of the magnetic core 118 and therefore does not risk disrupting the surrounding electrical components. Thus, the EMC (electromagnetic compatibility) is improved.

Figure 6:
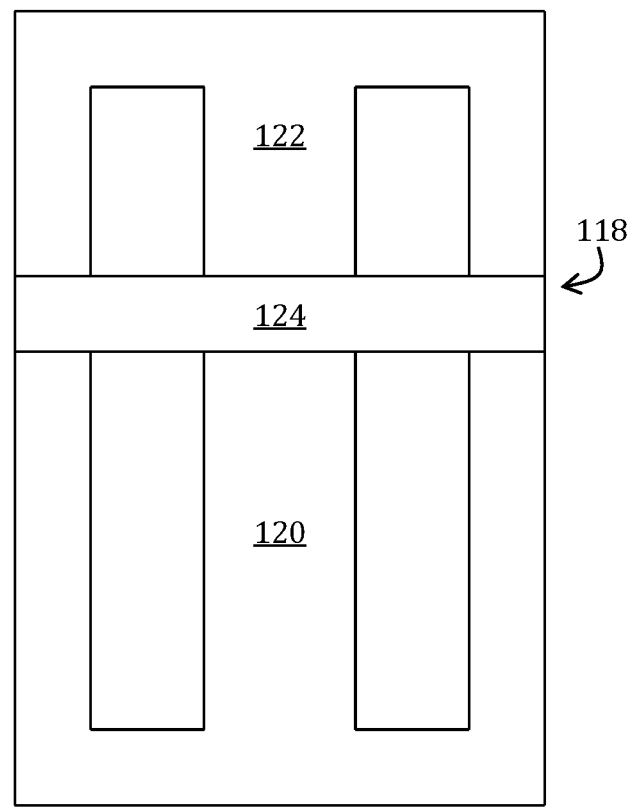
FIG. 6 is a sectional view of an alternative magnetic core according to the invention.

Furthermore, the particular shape of the magnetic core 118 makes it possible to manufacture it very easily, either with three E-shaped pieces (FIG. 4), or with two E-shaped pieces and one I-shaped piece (FIG. 6).

The present invention is not limited to the embodiments previously described, but on the contrary is defined by the following claims. It will indeed be obvious to one skilled in the art that modifications can be made hereto.

Furthermore, the terms used in the claims must not be understood as being limited to the elements of the embodiments described above, but must on the contrary be understood as covering all equivalent elements that one skilled in the art may deduce from his general knowledge.

The invention claimed is:

1. An electrical converter, comprising:
   a voltage generator designed to provide a variable voltage from a direct voltage,
   a resonant electrical circuit for providing an alternating current from the variable voltage, the resonant electrical circuit comprising:
      a magnetic component comprising:
         a magnetic core comprising an E-shaped lower part, an E-shaped upper part and an I-shaped central part closing both the lower part and the upper part so that the lower part and the central part define two lower magnetic circuits and the upper part and the central part define two upper magnetic circuits, wherein the lower part and the upper part of the magnetic core are made with a material having a maximum relative permeability below 100, while the central part is made with a material having a maximum relative permeability above 100,
         a first coil and a second coil wound around a central branch of the lower part to be coupled to one another,
         a third coil wound around a central branch of the upper part, the third coil being connected in series with the second coil,
         the central part having a reluctance lower than both that of the lower part along each lower magnetic circuit and that of the upper part along each upper magnetic circuit, and
         a capacitance connected in series with the second coil and the third coil, and
   a rectifier designed to provide a direct voltage to an electrical charge from the alternating current, the rectifier comprising:
      a smoothing capacitance configured to be connected in parallel with the electrical charge, and
      a diode bridge having inputs connected to both ends of the first coil and its output connected to the terminals of the smoothing capacitance.

2. The electrical converter according to claim 1, wherein the upper part comprises a first air gap.

3. The electrical converter according to claim 2, wherein the central branch of the upper part comprises the first air gap.

4. The electrical converter according to claim 2, wherein the central branch of the upper part comprises a bar, one end of which stops at a distance from the central part so as to form the first air gap.

5. The electrical converter according to claim 2, wherein the lower part comprises a second air gap.

6. The electrical converter according to claim 5, wherein the central branch of the lower part comprises the second air gap.

7. The electrical converter according to claim 6, wherein the central branch of the lower part comprises two aligned bars having ends opposite one another, separated from one another so as to form the second air gap.

8. The electrical converter according to claim 1, wherein the central branch of the lower part and the central branch of the upper part have no air gap.

9. The electrical converter according to claim 1, wherein the central part is made with a material having a maximum relative permeability above 1000.

10. The electrical converter according to claim 1, wherein the first and second coils have respective self-inductances L1, L2 and are coupled to one another so as to have a non-zero mutual inductance M, connected to the self-inductances L1 and L2 by a coupling coefficient k:

$$k = \frac{M}{\sqrt{L1 \cdot L2}}$$

the coupling coefficient k being greater than or equal to 0.9.

11. The electrical converter according to claim 1, wherein the magnetic core has an axial symmetry relative to a vertical axis centered on the central branches of the upper and lower parts.

12. The electrical converter according to claim 1, comprising three E-shaped mechanical pieces each having a transverse bar from which two side bars and a central bar originate,
   wherein the two first mechanical pieces are assembled across from one another such that their side and central bars are respectively aligned, these two first mechanical pieces forming the lower and central parts of the magnetic core, the central part being formed by the transverse bar of one of these two mechanical pieces, and wherein the third mechanical piece is assembled against the transverse bar forming the central part so as to form the upper part of the magnetic core.

13. The electrical converter according to claim 1, wherein the first and second coils have respective self-inductances L1, L2 and are coupled to one another so as to have a non-zero mutual inductance M, connected to the self-inductances L1 and L2 by a coupling coefficient k:

$$k = \frac{M}{\sqrt{L1 \cdot L2}}$$

the coupling coefficient k being greater than or equal to 0.95.

14. The electrical converter according to claim 1, wherein the first and second coils have respective self-inductances L1, L2 and are coupled to one another so as to have a non-zero mutual inductance M, connected to the self-inductances L1 and L2 by a coupling coefficient k:

$$k = \frac{M}{\sqrt{L1 \cdot L2}}$$

the coupling coefficient k being greater than or equal to 0.99.

15. An electrical system comprising:
a voltage source comprising a motor vehicle battery,
an electrical charge including electrical motor vehicle accessories, and
an electrical converter between the voltage source and the electrical charge, the electrical converter, comprising:
a voltage generator designed to provide a variable voltage from a direct voltage,
a resonant electrical circuit for providing an alternating current from the variable voltage, the resonant electrical circuit comprising:
a magnetic component comprising:
a magnetic core comprising an E-shaped lower part, an E-shaped upper part and an I-shaped central part closing both the lower part and the upper part so that the lower part and the central part define two lower magnetic circuits and the upper part and the central part define two upper magnetic circuits, wherein the lower part and the upper part of the magnetic core are made with a material having a maximum relative permeability below 100, while the central part is made with a material having a maximum relative permeability above 100,
a first coil and a second coil wound around a central branch of the lower part to be coupled to one another,
a third coil wound around a central branch of the upper part, the third coil being connected in series with the second coil,
the central part having a reluctance lower than both that of the lower part along each lower magnetic circuit and that of the upper part along each upper magnetic circuit, and
a capacitance connected in series with the second coil and the third coil, and
a rectifier designed to provide a direct voltage to an electrical charge from the alternating current, the rectifier comprising:
a smoothing capacitance configured to be connected in parallel with the electrical charge, and
a diode bridge having inputs connected to both ends of the first coil and its output to the terminals of the smoothing capacitance.

* * * * *